United States Patent [19]

McNeel et al.

[11] Patent Number: 4,893,290

[45] Date of Patent: Jan. 9, 1990

[54] THREE-AXIS SENSOR

[75] Inventors: William O. McNeel; James A. Sackett; Joe N. Wood, all of Houston; Julian Soliz, III, Pearland, all of Tex.

[73] Assignee: Western Atlas International, Inc., Houston, Tex.

[21] Appl. No.: 260,693

[22] Filed: Oct. 21, 1988

Related U.S. Application Data

[63] Continuation of Ser. No. 924,679, Oct. 29, 1986, abandoned.

[51] Int. Cl.⁴ .............................................. G01V 1/00
[52] U.S. Cl. .................................... 367/178; 181/102; 367/911
[58] Field of Search ................................. 181/102–106; 367/25, 86, 178–188, 911, 912

[56] References Cited

U.S. PATENT DOCUMENTS

| | | | |
|---|---|---|---|
| 3,283,293 | 11/1966 | Pavey, Jr. et al. | 235/186 |
| 4,021,774 | 5/1977 | Asmundsson et al. | 33/313 |
| 4,462,094 | 7/1984 | Bowden et al. | 367/188 |
| 4,525,819 | 6/1985 | Hefer | 367/188 |
| 4,701,890 | 10/1987 | Ohmer et al. | 367/25 |

OTHER PUBLICATIONS

Litton Resources System Brochure, LRS-1023, Thaxial Borehole Geophone, 1984.

Primary Examiner—Brian S. Steinberger
Attorney, Agent, or Firm—Barry C. Kane

[57] ABSTRACT

A transducer assembly for use along the surface of the earth or in a borehole to detect seismic signals along mutually orthogonal axes. The transducer assembly includes at least two geophones or accelerometers gimbally-mounted within a housing such that when the housing is oriented at substantially any angle, the enclosed geophones remain in their respective planes with respect to gravity and their axes of sensitivity to the seismic signals remain orthogonal to each other.

20 Claims, 4 Drawing Sheets

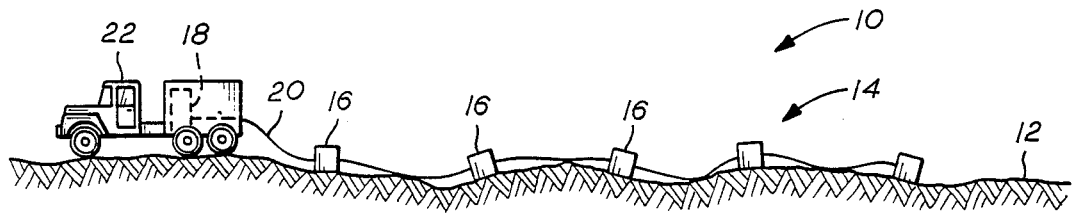
FIG. 1
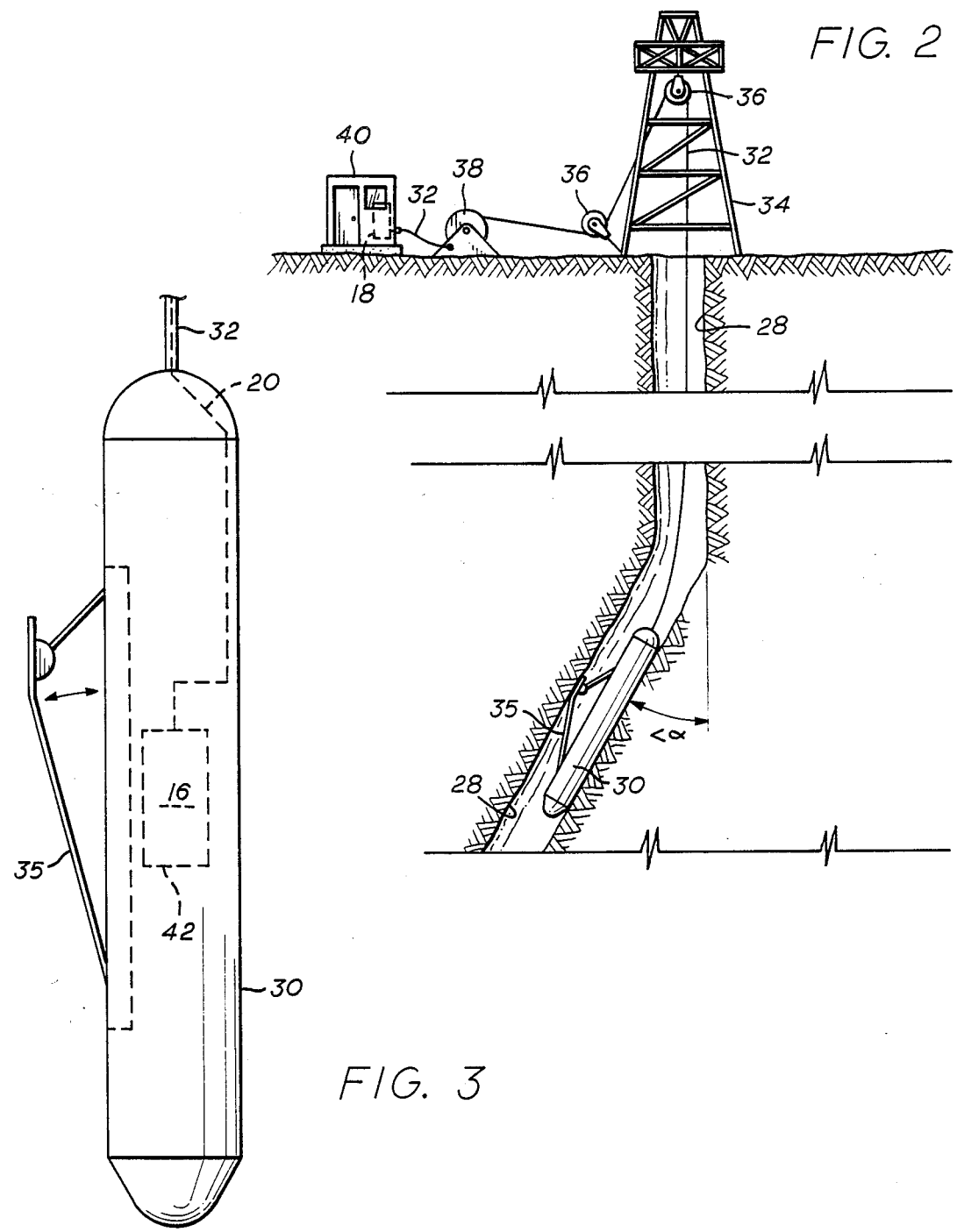
FIG. 2
FIG. 3

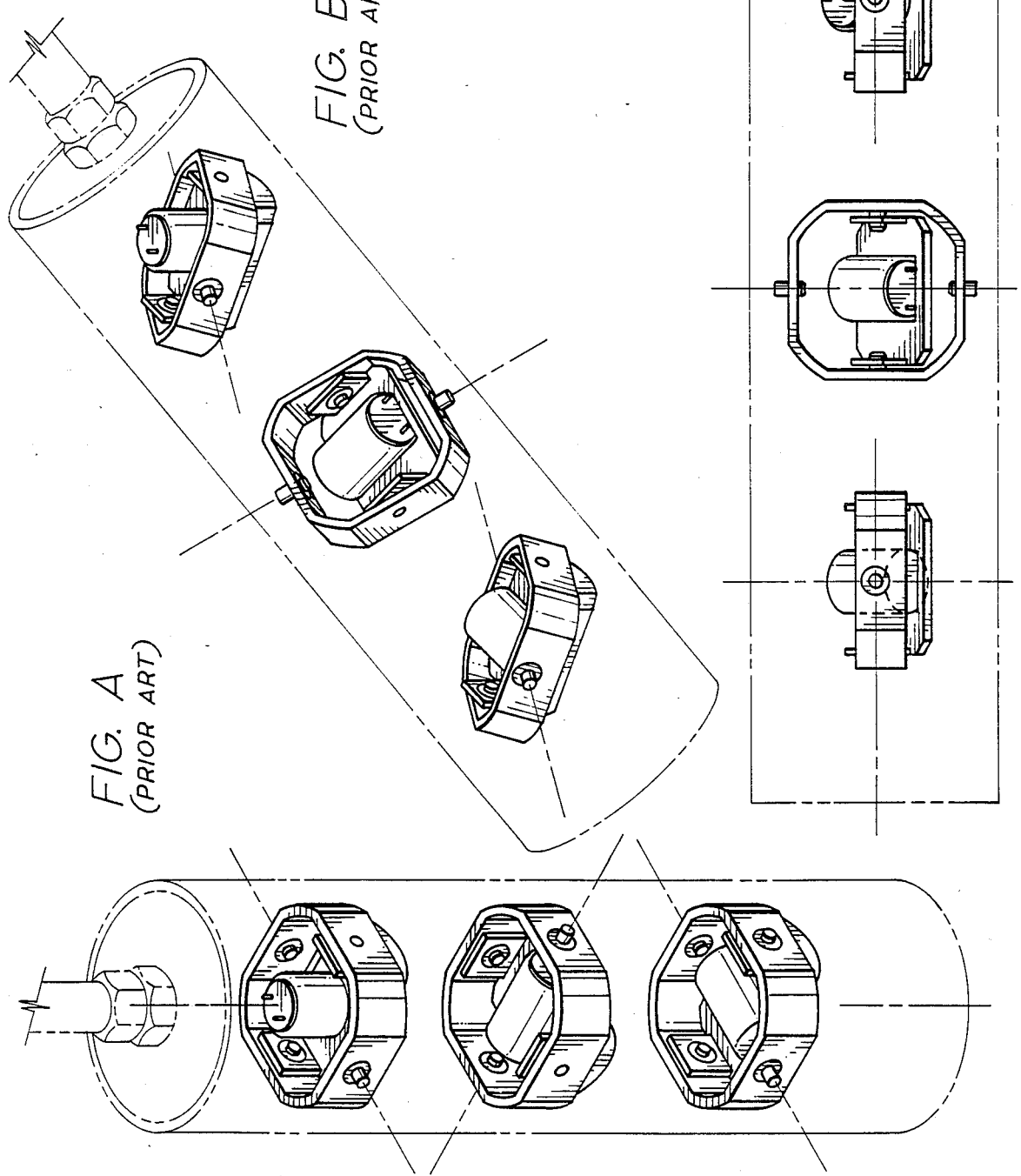

THREE-AXIS SENSOR

This is a continuation of co-pending application Ser. No. 924,679 filed on Oct. 29, 1986 now abandoned.

BACKGROUND OF THE INVENTION

1. Field of the Invention

The invention relates to seismic sensors and particularly to a device for detecting seismic signals along mutually orthogonal axes.

2. Discussion of the Related Art

In seismic exploration, a seismic source such as a vibrator or an explosive charge, introduce a seismic signal into the earth. The seismic signal propagates through the earth from the point of introduction as an expanding spherical wave front. As the wave front impinges upon textural or structural changes in the subsurface, a portion of the wave front may be reflected back to the surface. The reflected seismic signals that arrive at the surface may be detected by seismic sensors such as geophones deposited on the land or hydrophones deployed in water-covered environments.

The seismic signals originating from the source and reflected back to the surface typically include several types of seismic waves, each having distinguishing characteristics from the others. The types if seismic waves include compressional and shear waves, generally referred to as body waves, and two types of surface waves known as Raleigh waves and Love waves. Compressional waves and shear waves, commonly referred to as primary (P) and secondary (S) waves respectively, are of particular interest to exploration geophysicists, because they propagate at different velocities, and because they propagate to great depths unlike the surface waves.

Compressional and shear waves each have a distinct particle motion. In compressional waves, the particle motion of a propagating wave consists of alternating condensations and rarefractions during which adjacent particles of the propagating medium move closer together and further apart. The motion of the particles in a compressional wave is therefore always in the direction of wave propagation. In a shear wave, particle motion consists of undulations parallel to the wave front where the particle motion is always perpendicular to the direction of wave propagation. If during the propagation of a shear wave, the particles all undulate in parallel lines, the wave is said to be polarized in a direction of the undulations. A horizontallytraveling shear wave polarized so that the particle motion is all vertical is designated as an SV or vertical shear wave; when its particle motion is all horizontal, it is called an SH or horizontal shear wave. Shear waves may be polarized in planes other than the vertical and the horizontal but for the purposes of study, their components may be resolved in horizontal and vertical planes.

Because of the different particle motion and propagation velocities of the two wave types, compressional wave and shear waves are important in determining the characteristics of the subsurface. The two-wave types are used to "fingerprint" the propagation characteristics of the subsurface formations. These characteristics of the subsurface may be measured by placing sensors along the surface of the earth or by placing sensors at different depths in a bore hole.

In the past, detection of the two body waves has been accomplished by using conventional geophones. The geophones are placed on the ground with their single axis of sensitivity oriented either horizontally to detect shear waves, or vertically to detect the compressional waves. Each sensor had to be properly placed on the ground to assure proper orientation with respect to the propagation direction of the desired signal to be detected. This was particularly true for sensors used to detect frequencies 14 Hertz (Hz) or less. The low frequency sensors would become inoperable at tilt angles of 5 degrees or more.

In later detectors, three sensors were mounted to a single chassis such as that the axis of sensitivity for the sensors were fixed 90 degrees to each other. Thus, one unit consisting of three sensors could be used to detect both compressional waves and shear waves. The same problem of orientation existed in this sensor as it did for a single sensor. The sensors must be properly oriented so that the axes were both vertical and horizontal, so that each wave type could be detected.

Similar problems existed in vertical seismic arrays where the sensor was deployed in the borehole. Boreholes are not perfectly cylindrical. There are irregularities in the borehole diameter as well as inclination. Often sensors disposed in boreholes assumed orientations other than vertical or horizontal when wedged tightly against the side of the borehole. To solve the problem of tilted sensors in a borehole, the sensors were hung in the casing on a trunnion. One sensor may have been mounted vertically and two sensors may have been mounted horizontally, but at 90 degrees to each other. As the sensor case became inclined when forced against the borehole wall, the trunnioned sensors where supposed to hang vertically in the proper orientation so as to detect both the compressional and shear waves. A major disadvantage in this arrangement was that the horizontal sensors did not remain orthogonal to each other when tilted. The horizontal sensors would be orthogonal with the housing oriented vertically, but as it was inclined, the two horizontal sensors would assume orientations where their axes were not 90 degrees to each other. If the housing were to be oriented horizontally and the sensors allowed to pivot freely, they could be essentially parallel to each other, and thus detect the same signals.

Other attempts to resolve the problem of maintaining sensor orthogonality resulted in the use of gimbals. Three geophones fixed on a single chassis were mounted on a dual-axis gimbal. This resulted in a gimballed-transducer assembly having a diameter too large for use as a downhole tool. Additionally, the orientation of the chassis became indeterminate when tilted too far along the pivot axis of the outer gimbal. The primary disadvantage in using the single-gimbal geophone assembly was size.

FIGS. A-C show a later modification which included separately mounting each sensor on a gimbal. The individual mounting of the sensors allowed a reduction of the tool diameter, but had the same problem in maintaining the orthogonality of the sensor axes. As the tool was tilted, the gimbals pivoted so that the axes of the two horizontal sensors, originally orthogonal to each other in a first position, became substantially parallel to each other in a second tilted position. This resulted from the rotational offset of the outer pivot axis of one gimbal 90 degrees to the outer pivot axis of the other gimbal. As the gimbals pivoted, the inner pivot axes became parallel and thus, so did the axis of sensitivity of the sensors. Another major disadvantage in the individually-gimbaled geophone is indeterminant positioning of the geophones when tilted beyond some critical angle in the plane including the outer pivot axis. When an outer pivot axis is tilted on end, the restoring or gravitational force required to stabilize the gimbal cannot pivot about the axis, thus, the geophone is allowed to wander about the inclined pivot axis.

SUMMARY OF THE INVENTION

It is an object of this invention to detect seismic signals along a plurality of mutually orthogonal axes.

It is another object of this invention to detect the seismic signals using conventional sensors gimbally mounted in a housing.

It is yet another object of this invention to maintain the orthogonality of said sensors' axes of sensitivity and the relative orientation with respect to the gravity while the external housing or tool is oriented at substantially any angle.

In one embodiment of this invention, a plurality of seismic sensors, such as geophones or accelerometers, are gimbally mounted in a housing. The axis of sensitivity for each sensor is oriented such that each is orthogonal to the others. The orthogonality of the sensor axes is maintained at substantially any orientation of the housing by mounting the outer pivot axis of each gimbal parallel to the outer pivot axes of the other gimbals. The gimbal arrangement also allows the axes of sensitivity to remain in orthogonal planes with respect to gravity.

In another embodiment of this invention, at least one sensor is mounted horizontally on a single axis gimbal or trunnion where the axis of sensitivity is perpendicular to the pivot axis. The pivot axis of the trunnion should be parallel or coplanar with the outer pivot axes of the other gimbals in the transducer assembly. The coplanar orientation of the outer pivot axes insures that the sensors will maintain their orthogonality with each other. The trunnion mounting preserves the horizontal attitude of the axis of sensitivity as the housing is inclined.

In another embodiment of this invention, electrical connections with the sensors are made through sliprings integral with the gimbal pivot-axes instead of separate wire conductors.

In yet another embodiment of this invention, mechanical stops are added to the gimbals to prevent each table from rotating freely 360 degrees about each pivot axis, insuring that the sensors will not become indeterminate above a predetermined critical angle.

BRIEF DESCRIPTION OF THE DRAWINGS

A better understanding of the benefits and advantages of my invention may be obtained from the appended detailed description and the drawings, wherein:

FIGS. A–C generally illustrate a prior art device at different angles of inclination;

FIG. 1 is a general illustration of a seismic survey;

FIG. 2 is a general illustration of a vertical seismic survey;

FIG. 3 is a generalized diagram of a sonde for use in vertical seismic surveying;

DESCRIPTION OF THE PREFERRED EMBODIMENT

Figure 4A:
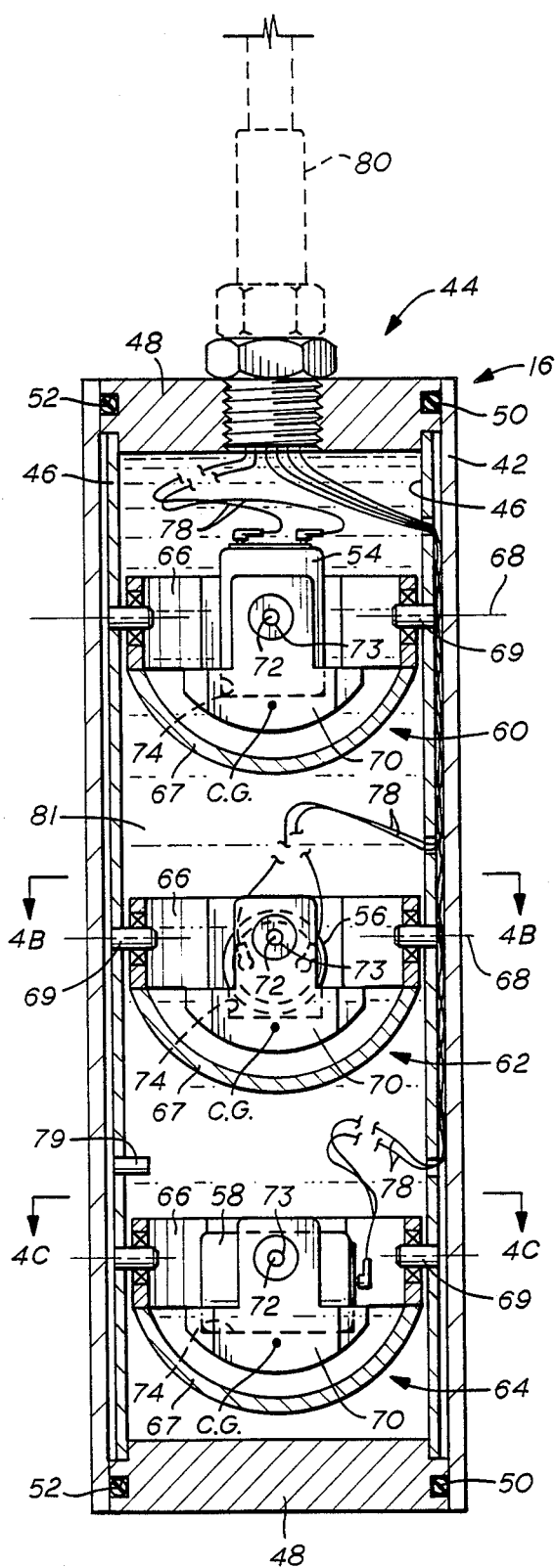
FIGS. 4A–C are cross-sectional views of a transducer assembly embodied by this invention.

In reference to the Figures, like reference numerals indicate like components, wherein FIG. 1 is a general illustration of a seismic survey 10 defined along the surface of the earth 12 by a seismic detector system generally indicated as 14. The seismic detector system may include a plurality of transducer assemblies 16 deposited along the surface of the earth at predetermined intervals, each interconnected to a remote recording unit 18 by a predetermined length of cable 20. The remote recording unit 18 may be mounted on a vehicle such as 22 for portability. A seismic source at or near the surface 12, generates a seismic signal which may readily radiate from the point of introduction as an expanding wave front. The seismic signal is partially reflected from subsurface irregularities in structure or composition of the rock where it is received at the surface 12 by the plurality of transducer assemblies 16. The transducer assemblies 16 may convert the kinetic energy of the received seismic signal to electrical or optical signals which are transmitted over the cable 20 to the remote recording unit 18.

FIG. 2 is a general illustration of a vertical seismic survey 26 conducted in a well or borehole 28. The borehole 28 may include a predetermined portion thereof 28' which deviates from the vertical at an angle ($\alpha$) such as 70 degrees or more. A sonde 30 may be disposed in the borehole 28 (28') at a predetermined depth by a length of cable 32 suspended from a support 34 such as a derrick or hoist positioned thereabove. The sonde 30 may be urged against the side of the borehole 28 by an adjustable caliper or anchor 35 mechanically activated from within the sonde 30. The portion of the cable proximate the top of the borehole 28 may pass around pulleys 36 and be wound on a drawworks 38. The cable 32 may be interconnected through the drawworks 38 to the remote recording unit 18 which may be contained in a portable building typically termed a dog house 40.

FIG. 3 is a generalized diagram of the sonde 30 which may contain one or more transducer assemblies 16. The transducer assembly 16 may be interconnected to the remote recording unit 18 at the surface by a conductor cable such as 20 which may be an integral part of cable 32. In FIG. 3, transducer assembly 16 is illustrated as having an elongate housing 42 to fit within the diameter of the sonde 30. Although it is preferred that the housing be elongate, it is not necessary. Other components in the sonde 30 may include radioactive sources and detectors, electrical or resistivity sensing equipment, and other components typically associated with well-logging tools.

Figure 4B:
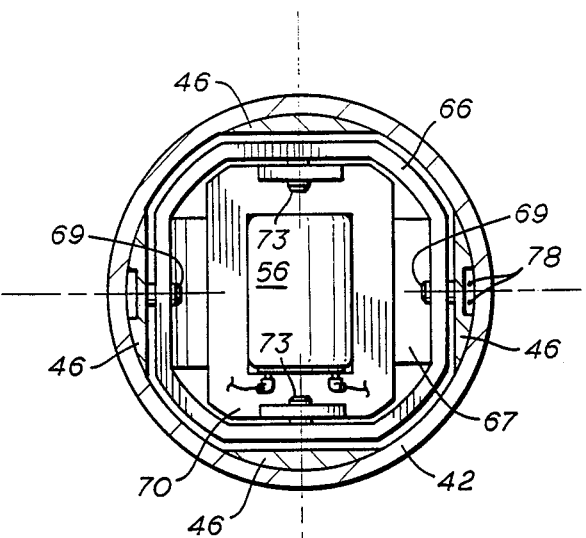
Figure 4C:
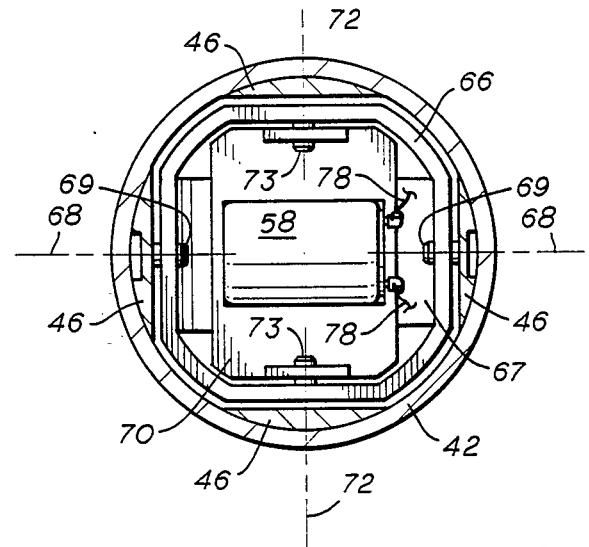

FIGS. 4A–C are views in partial cross-section of the transducer assembly 16 as depicted in FIG. 3 wherein FIG. 4A the transducer assembly 16 is enclosed by a housing 42. The housing 42 may be manufactured from brass or other non-magnetic, high-strength material. The housing 42 may receive a frame or chassis 44 having a plurality of supports 46 such as four which may be interconnected to each other by end members 48. Alternatively, support 46 may be a unitary chassis manufactured from a cylinder having an outside diameter substantially equal to the inside diameter of housing 42. End members 48 close the ends of the housing 42. O-rings 50 may be received by channels 52 located about end members 48 to form a seal with an inner surface of the housing 42.

Disposed within the frame 44 are at least two, but preferably three seismic sensors 54, 56 and 58 such as for example the LRS-1011 geophone manufactured by Litton Resources Systems in Alvin, Tex. It should be understood that other sensors such as accelerometers may also be used. As is well known, geophones typically have a single axis of sensitivity related to the longitudinal axis of the internal moving coil or magnet. Each sensor 54-58 may be mounted on a dual-axis gimbal such as 60, 62, 64 which in turn may be mounted vertically between the supports 46. Each gimbal 60-64 may include an outer table 66 having an outer-pivot axis 68 defined by pins 69 coupled to the supports 46. Each outer table 66 may have a counter weight 67 diametrically disposed thereunder and meeting the outer table at the junction of each pin 69. The counter weight 67 places the center of gravity (CG) of the outer table at a point substantially below the outer-pivot axis 68. This provides a greater restoring force to the outer table to maintain a horizontal position with respect to gravity. Each gimbal may also have an inner table 70 with an inner-pivot axis 72 rotated 90 degrees from pivot axis 68 and defined by pins 73 extending into the outer table 66. The inner table 70 is designed so that much of its mass is substantially below the inner-pivot axis 72. Each sensor 54-58 may be received within a seat 74 defined in the top of inner table 70. The seat is preferably deep enough such that one-half or more of each sensor 54-58 is located below the outer- and inner-pivot axes 68 and 72 respectively. This aids in keeping the center of gravity (CG) of the inner table below the inner-pivot axis to provide a greater restoring force (longer arm on a fulcrum) to maintain its horizontal orientation with respect to gravity. In any case, each gimbal may rotate freely about each pivot axis. Ease of rotation about each pivot axis may be increased by bearings around each pin.

Sensors 54-58 may be mounted on the inner tables 70 of each gimbal 60-64 such that the axes of sensitivity of the three sensors are orthogonal to each other as seen in FIGS. 4B and 4C. Thus, it is preferred to orient the axis of sensitivity for sensor 54 vertically and the axes of sensitivity for sensors 56 and 58 horizontally; sensor 56 perpendicular to the outer-pivot axis 68 and sensor 58 parallel to the outer-pivot axis 68. This orientation provides the preferred orthogonality of the axes of sensitivity. It is important to note that the gimbals 60-64 are mounted to chassis 44 such that the outer-pivot axes 68 are aligned in the same vertical plane and parallel to each other.

Referring back to FIG. 4A, each sensor 54, 56 and 58 may be operably coupled by a conductor pair such as 78 to a connector 80 which may be located in one of the end members 48. The conductor pairs 78 preferably run from the connector 80 along one of the longitudinal supports 46 to a location proximate each respective gimbal axis 68. A service loop of conductors 78 may extend from the support 46 to the sensors 54-58 so as to provide an ample length of conductor to allow the gimbal to pivot freely about its axes. Mechanical stops such as pins 79 may be added to the gimbals to prevent the gimbals from swinging 360 degrees about their pivot axes and breaking the service loops. The stops also insure that the sensors do not become indeterminate above some predetermined critical tilt angle in the plane of the outer pivot axes 68.

Figure 5:
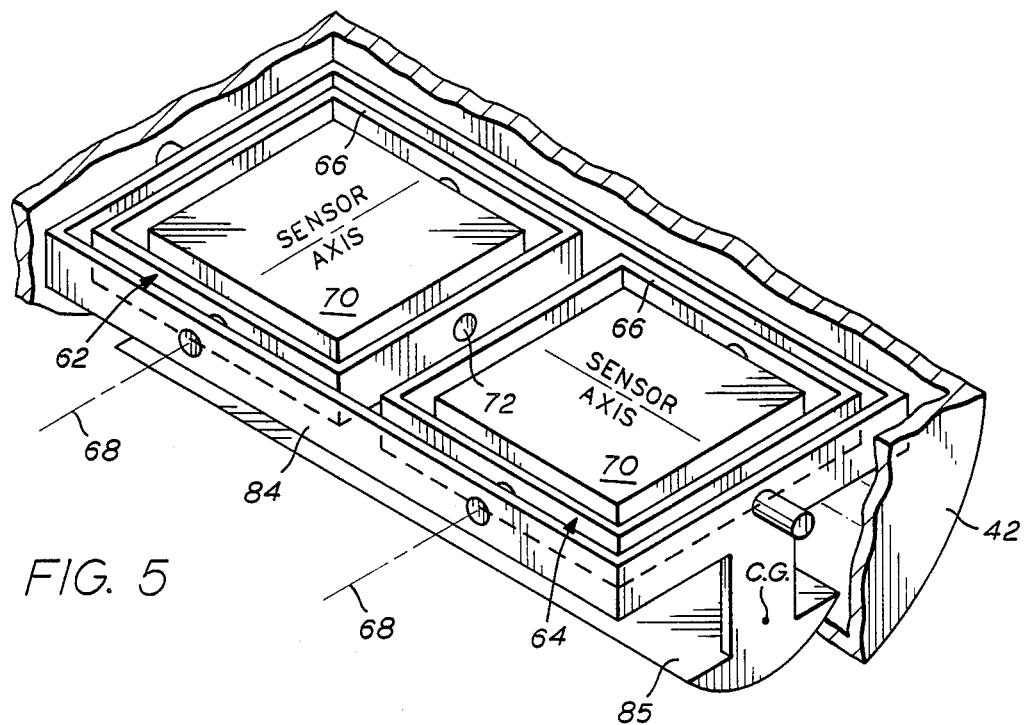
FIG. 5 is one alternate embodiment of a gimbal arrangement which may be used in transducer assembly.

In alternate embodiment of this invention, shown in FIG. 5, two gimbals 62-64 may be mounted in a trunnion 84 having its pivot axis concentric with the longitudinal axis of the housing 42. Trunnion 84 may also have a counter weight 85 serving identically as the counter weights 67 on the individual gimbals described above. Trunnion 84 may have 360 degrees of rotation freedom but it is preferred to restrict the rotation to 180 degrees. This provides a greater degree of tilt ability to the housing particularly when tilted in the plane containing the outer pivot axes 68. The longitudinal gimbal 84 may rotate when tilted to orient the outer pivot axes 68 perpendicular to the tilt angle. Mechanical stops such as pins or blocks may prevent complete rotation so as not to break the service loops 78 to the sensors 54-58.

In another embodiment of the instant invention, gimbal 62 may be a trunnion. The single pivot axis would be identical to pivot axis 68 mentioned previously. Sensor 56 may be horizontally mounted with its axis of sensitivity oriented perpendicular to the pivot axis. The trunnion may be limited to 180 degrees or less of rotation by means of mechanical stops mentioned above.

Figure 6:
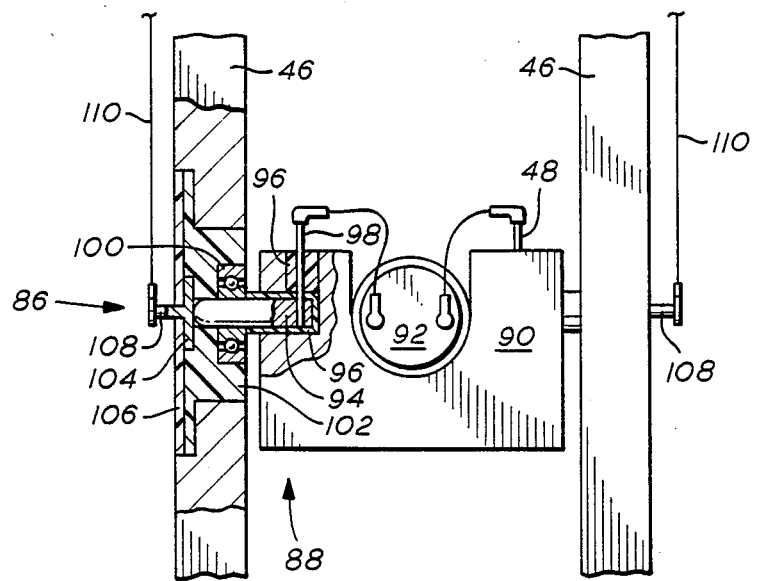
FIG. 6 is an alternate embodiment of a gimbal.

In yet another embodiment of this invention, the conductor service loop 78 may be exchanged for slip-rings such as shown in FIG. 6. For purposes of illustration, slip-ring conductors 86 are shown on a trunnion 88 mounted between two supports 46. Pivot table 90, having a horizontally disposed sensor such as 92, contains oppositely extending pins 94 mounted in an insulator 96. Two conductor pins 98 surrounded by the insulator 96 extend into the pivot table 90 and intersect the pins 94. The conductor pins 98 are electrically coupled to the appropriate poles on the sensor 92. The free ends of pins 94 may be received by a bearing 100 supported in a housing 102 contained in each support 46. A slip contact 104 may engage the free end of each pin 94 extending through the bearing 100 and held tightly there against by a nonconducting cap 106. The slip-contact 104 may have a solder cup or conductor pin 108 extending therefrom and through cap 106 which may receive a conductor wire 110. Although a trunnion 88 gimbal is shown in FIG. 76, it is understood that substantially the same principal may be used on a dual-axis gimbal as used in this invention.

Filling the housing 42 and surrounding the enclosed sensors 54-58 may be oil 81. It is preferred that oil 81 be nonconductive and have a viscosity approximately equal to 12,000 centipoise (cp) at 72 degrees Fahrenheit (°F.) and have a service temperature ranging from approximately $-40°$ F. to $500°$ F. The oil 81 reduces the noise floor or "ringing" produced by the sensors by damping the swinging motion of the gimbals. The oil also acts as a high-frequency coupler of the sensors to the housing. Without the oil the sensors are only coupled to the housing by way of the gimbals which tend to attenuate the high frequencies.

In operation, the individual transducer assemblies 16 may be deposited along the surface of the earth 12 as shown in FIG. 1. Coupling of each sensor to the ground may be increased by using spikes coupled to the housing exterior and inserted into the earth. The transducer assemblies 16 may also be incorporated in a sonde such as 30 and deployed in a borehole at a predetermined depth. The sonde may be urged tightly against the borehole wall by well-known means such as calipers or locking arms.

In each of the configurations provided above, as the housing 42 is inclined along any plane, gravitational forces act upon each gimbal such that the center of gravity (CG) of each table in a gimbal assumes its lowest point or energy level. That is to say that at any instant in time, the housing 42 may be inclined at and angle with respect to the gravitational vertical along any plane within a 0-360 degree vertical rotation axis, and the enclosed sensors will maintain their original orientation with respect to the gravitational vertical and will also remain orthogonal to each other. Each gimbal is substantially identical and mounted to the chassis such that the pivot axes are in common planes; each responds identically to the tilt of the housing. Since the sensors were mounted to the gimbals with their axes of sensitivity orthogonal to each other, they will remain so because of the identical response of each gimbal to gravity.

For illustrative purposes, my invention has been described with a certain degree of specificity. Variations will occur to those skilled in the art but which may be included within the scope and spirit of this invention which is limited only by the appended claims.

We claim as our invention:

1. An apparatus for detecting seismic signals along orthogonal axes, consisting essentially of:
    (a) a housing having a longitudinal axis;
    (b) at least two gimbals located within the housing, the gimbals providing two degrees of rotational freedom perpendicular to the longitudinal axis of the housing, each gimbal having an outer table pivotally coupled to the housing perpendicular to the longitudinal axis thereof to define a first pivot axis, and an inner table pivotally coupled to the outer table at a right angle to the first pivot axis to define a second pivot axis, the first pivot axis of each gimbal is contained in a common plane passing through the housing and contains the longitudinal axis of the housing; and
    (c) at least two seismic sensors disposed within the housing, each having an axis of sensitivity to the seismic signals and each suspended within the housing by one of said gimbal, the sensors oriented such that their axes of sensitivity are orthogonal to each other, and remain orthogonal with the longitudinal axis of the housing inclined from a horizontal.

2. An apparatus as defined in claim 1, further comprising:
    (a) a third gimbal located within the housing providing two degrees of rotational freedom perpendicular to the longitudinal axis of the housing, the third gimbal having an outer table pivotally coupled to the housing perpendicular to the longitudinal axis to define a first pivot axis, and an inner table pivotally coupled to the outer table at a right angle to the first pivot axis to define a second pivot axis, the first pivot axis of the third gimbal contained in the common plane; and
    (b) a third seismic sensor disposed within the housing and having an axis of sensitivity to the seismic signals oriented orthogonal to the axes of sensitivity of the other sensors.

3. An apparatus as defined in claim 2, further comprising:
    (a) a substantially incompressible, viscous fluid substantially filling the housing for substantially dampening a swinging motion of each gimbal, acoustically coupling the seismic sensors to the housing and preventing a collapse of the housing under pressure; and
    (b) means for operably interconnecting the sensors to a remote recording unit.

4. An apparatus as defined by claim 3, wherein the means for operably interconnecting comprises a plurality of conductors interconnecting each of the sensors to the remote recording unit.

5. An apparatus as defined by claim 3, wherein the means for operably interconnecting comprises:
    (a) at least two slip-ring conductors integral with the first pivot axis of the gimbals;
    (b) a plurality of conductors operably coupling the sensors to the slip-ring conductors; and
    (c) a plurality of conductors operably coupling the slip-ring conductors to the means for recording the seismic signals.

6. An apparatus as defined by claim 1, further comprising is a trunnion having a single pivot axis of rotation perpendicular to the longitudinal axis and is contained in the common plane, the trunnion retaining one of the sensors thereon having an axis of sensitivity oriented perpendicular to the single pivot axis of rotation.

7. An apparatus for use in a bore hole to detect seismic signals along orthogonal axes, consisting essentially of in combination:
    (a) a housing having a longitudinal axis and adapted to engage the bore hole;
    (b) a plurality of gimbals located within the housing for providing two degrees of rotational freedom perpendicular to the longitudinal axis of the housing, each gimbal having a first and a second table, the first table pivotally coupled to the housing to define a first pivot axis perpendicular to the longitudinal axis of the housing with the first pivot axis for each gimbal contained in a common plane including the longitudinal axis of the housing, the second table concentric with and pivotally coupled to the first table at a right angle to the first pivot axis to define a second pivot axis perpendicular to the longitudinal axis of the housing; and
    (c) a plurality of detectors disposed within the housing and oriented along orthogonal axes, the detectors being able to maintain their orthogonal orientation to each other with the longitudinal axis of the housing inclined with respect to a horizontal plane.

8. An apparatus as recited in claim 7, further comprising:
    (a) means substantially filling the housing, for substantially dampening a swinging motion of the gimbals about their pivotal connections and acoustically coupling the plurality of detectors to the housing; and
    (b) means for interconnecting the plurality of detectors to a remote recording unit.

9. An apparatus as recited in claim 8, wherein the means for interconnecting the plurality of detectors to a remote recording unit comprises:
    (a) a plurality of conductors having a service loop extending from the plurality of detectors to the remote recording unit.

10. An apparatus as recited in claim 8, wherein the means for interconnecting the plurality of detectors to a remote recording unit comprises:
    (a) at least two slip-ring conductors integral with the first pivot axes of the gimbals;

(b) a plurality of conductors operably coupling the plurality of detectors to the slip-ring conductors; and (c) a plurality of conductors operably coupling the slip-ring conductors to remote recording unit.

11. An apparatus as recited in claim 8, wherein the means substantially filling the housing, for substantially dampening a swinging motion of the gimbals about their pivot axes and acoustically coupling the plurality of detectors to the housing comprises, a viscous fluid.

12. An apparatus as recited in claim 7, further comprising a trunnion pivotally coupled to the housing perpendicular to the longitudinal axis of the housing so as to define a single pivot axis co-planar and parallel with the first pivot axis of each gimbal, the trunnion having a sensor mounted thereon and oriented perpendicular to the pivot axis of the trunnion.

13. An apparatus as recited in claim 7, wherein each of the plurality of gimbals has a counter weight substantially below the first and second pivot axes.

14. A transducer assembly as recited in claim 13 further comprising;
(a) a frame fixed within the housing and having each gimbal coupled thereto in the common plane;
(b) means, substantially filling the housing, for dampening a swinging motion of the gimbals about their pivot axes and acoustically coupling the plurality of sensors to the housing;
(c) means for interconnecting the plurality of sensors to a remote recording unit.

15. A transducer assembly for detecting seismic signals in the earth along mutually orthogonal axes, comprising in combination:
(a) a rigid housing, having a longitudinal axis, for engaging the earth,
(b) a frame within the housing and rigidly coupled thereto;
(c) a plurality of gimbals located within the housing providing two degrees of rotation freedom perpendicular to the longitudinal axis of the housing, each gimbal having an outer and an inner table, the outer table being pivotally connected to the frame so as to define a first pivot axis perpendicular to the longitudinal axis, of the housing, the inner table being concentrically received by the outer table and being pivotally connected thereto at a right angle to the first pivot axis to define a second pivot axis perpendicular to the longitudinal axis of the housing; and
(d) a plurality of detectors disposed within the housing and mounted on a respective gimbal so that the seismic signals are received along orthogonal axes as long as the longitudinal axis of the housing is inclined with respect to a horizontal plane.

16. A transducer assembly as recited in claim 15, wherein each gimbal has a counter weight disposed below the pivot axes.

17. A transducer assembly for detecting seismic signals along orthogonal axes, consisting essentially of in combination:
(a) an elongate housing having a longitudinal axis;
(b) at least two gimbals disposed within and coupled to the housing, each of the gimbals having a first and a second table, the first table being pivotally coupled to the housing at a right angle to the longitudinal axis to define a first pivot axis, the second table concentrically disposed within the first table and pivotally coupled thereto at a right angle to the first pivot axis to define a second pivot axis, each of the gimbals providing two degrees of rotational freedom perpendicular to the longitudinal axis of the housing; and
(c) a plurality of seismic sensors disposed within the housing, each of the seismic sensors mounted on the second table of a respective gimbal so that each of the seismic sensors detects the seismic signals along an orthogonal axis with the longitudinal axis of the housing inclined with respect to a horizontal datum.

18. The transducer assembly as defined by claim 17, further comprising:
(a) a third gimbal disposed within the housing, the third gimbal having a first and a second table, the first table being pivotally coupled to the housing at a right angle to the longitudinal axis to define a first pivot axis, the second table concentrically disposed within the first table and pivotally coupled at a right angle to the first pivot axis to define a second pivot axis, the third gimbal providing two degrees of rotational freedom perpendicular to the longitudinal axis of the housing; and
(b) one of the plurality of seismic sensors mounted to the second table and oriented perpendicular to the plurality of seismic sensors.

19. The transducer assembly as defined by claim 17, further comprising:
(a) a trunnion having a first table pivotally coupled to the housing at a right angle to the longitudinal axis to define a first pivot axis; and
(b) one of the plurality of seismic sensors mounted to the first table to detect seismic signals along a horizontal axis perpendicular to the first pivot axis.

20. The transducer assembly so defined by claim 17, further comprising a substantially incompressible and viscous fluid substantially filling the housing for dampening a swinging motion of the gimbals, acoustically coupling the sensors to the housing, and preventing collapse of the housing under pressure.

* * * * *